United States Patent
Bentaj et al.

(10) Patent No.: US 10,280,570 B2
(45) Date of Patent: May 7, 2019

(54) METHOD FOR RECOVERING AND/OR RECYCLING A BITUMINOUS PRODUCT

(71) Applicants: Camille Compagnie d'Assistance Miniere et Industrielle, Saint Ouen l'Aumone (FR); Soprema, Strasbourg (FR)

(72) Inventors: Abdelaziz Bentaj, Saint Ouen l'Aumone (FR); Pierre-Etienne Bindschedler, Strasbourg (FR); Rémi Perrin, Strasbourg (FR); Audrey Arnault, Strasbourg (FR); Morad Bentaj, Saint Ouen l'Aumone (FR); Gauthier Demaret, Saint Ouen l'Aumone (FR)

(73) Assignees: Camille Compagnie d'Assistance Miniere et Industrielle (FR); Soprema (FR)

( * ) Notice: Subject to any disclaimer, the term of this patent is extended or adjusted under 35 U.S.C. 154(b) by 0 days.

(21) Appl. No.: 15/546,113

(22) PCT Filed: Feb. 12, 2016

(86) PCT No.: PCT/EP2016/053030
§ 371 (c)(1),
(2) Date: Jul. 25, 2017

(87) PCT Pub. No.: WO2016/128554
PCT Pub. Date: Aug. 18, 2016

(65) Prior Publication Data
US 2018/0010305 A1    Jan. 11, 2018

(30) Foreign Application Priority Data
Feb. 13, 2015 (FR) ................... 1551187

(51) Int. Cl.
| | | |
|---|---|---|
| *C10C 3/08* | (2006.01) | |
| *E01C 19/10* | (2006.01) | |
| *B01J 19/08* | (2006.01) | |
| *C10G 32/02* | (2006.01) | |
| *C10G 1/04* | (2006.01) | |
| *B01J 19/12* | (2006.01) | |

(52) U.S. Cl.
CPC ......... *E01C 19/1004* (2013.01); *B01J 19/087* (2013.01); *B01J 19/123* (2013.01); *C10C 3/08* (2013.01); *C10G 1/045* (2013.01); *C10G 1/047* (2013.01); *C10G 32/02* (2013.01); *B01J 2219/089* (2013.01); *B01J 2219/0809* (2013.01); *B01J 2219/0815* (2013.01); *B01J 2219/0869* (2013.01); *B01J 2219/0871* (2013.01); *B01J 2219/0888* (2013.01); *B01J 2219/1203* (2013.01)

(58) Field of Classification Search
CPC ........................................................ C10C 3/08
See application file for complete search history.

(56) References Cited

U.S. PATENT DOCUMENTS

| | | |
|---|---|---|
| 8,746,598 B2 * | 6/2014 | Bentaj |
| 2012/0132731 A1 | 5/2012 | Bentaj et al. |

FOREIGN PATENT DOCUMENTS

| | | |
|---|---|---|
| WO | 2009058103 A1 | 5/2009 |
| WO | 2010092134 A1 | 8/2010 |

OTHER PUBLICATIONS

M. M. Batista et al., Determination of the Solubility Parameters of Biodiesel from Vegetable Oils, 27 Energy Fuels 7497-7509 (2013).*
Hansen, C. M., "The three dimensional solubility parameter and solvent diffusion coefficient: Their importance in surface coating formulation", Danish Technical: Copenhagen, 14, Journal of paint technology, vol. 39, 105, Feb. 1967, 103 pages.
Hansen, C. M., "Hansen solubility parameters: A users handbook", Second Edition, CRC press, Boca Raton Jun. 15, 2007, 546 pages.
Asli et al., "Investigation on physical properties of waste cooking oil — Rejuvenated bitumen binder", Construction and Building Materials 37, Dec. 2012, pp. 398-405.
International Search Report for Application No. PCT/EP2016/053030 dated Apr. 21, 2016.
French Search Report for Application No. FR1551187 dated Nov. 30, 2015.

* cited by examiner

*Primary Examiner* — Randy Boyer
(74) *Attorney, Agent, or Firm* — Lerner, David, Littenberg, Krumholz & Mentlik, LLP

(57) ABSTRACT

The invention concerns a method (100) for recovering and/or recycling a bituminous product by means of pulsed power, the bituminous product comprising bitumen and elements to be separated, involving the following steps:
supplying (101) a reactor (11) inside which at least two electrodes (13) extend with the bituminous product and a liquid medium of which at least one liquid component has Hansen solubility parameters $\delta\eta$, $\delta\rho$ and $\delta d$ such that the bitumen is at least partially soluble in the liquid medium, the elements to be separated being insoluble,
generating (102) a series of electromagnetic pulses between the electrodes (13) in the reactor (11) so as to produce, as a result of the power, the frequency and the switching time of the electromagnetic pulses, at least one shock wave and at least ultraviolet radiation, in such a way as to disperse and dissolve the bitumen in the liquid medium, and to separate the bitumen and the insoluble elements, the liquid medium preventing the reconstitution of the bitumen.

22 Claims, 5 Drawing Sheets

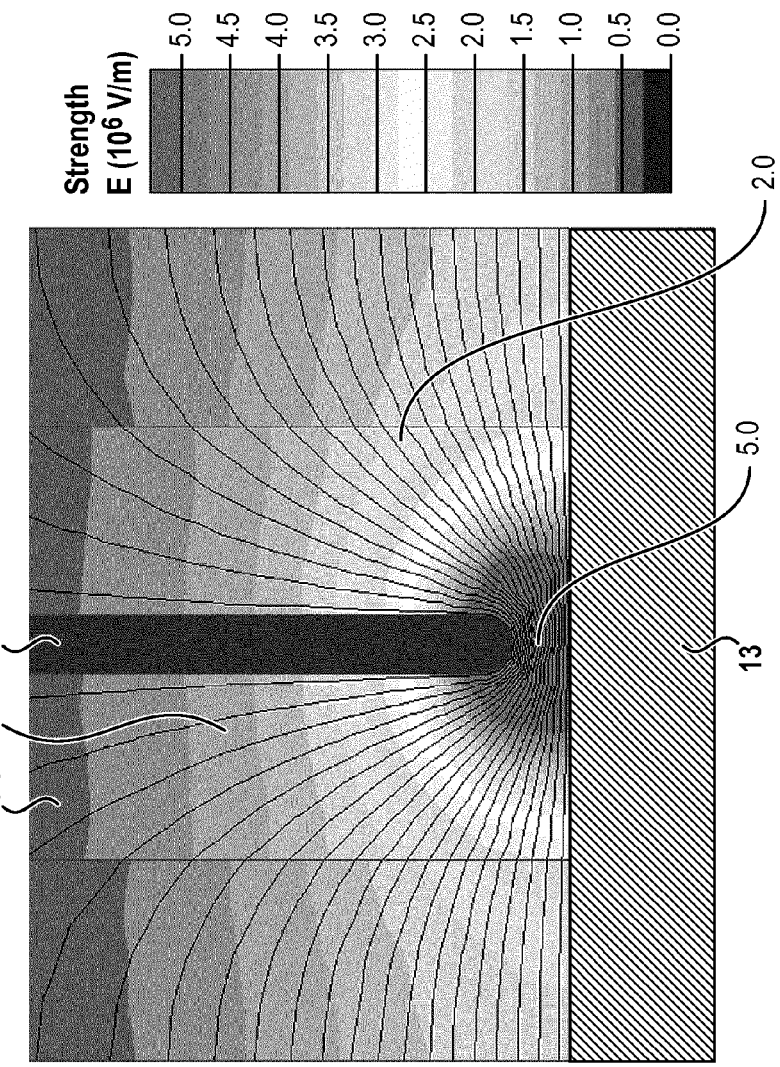

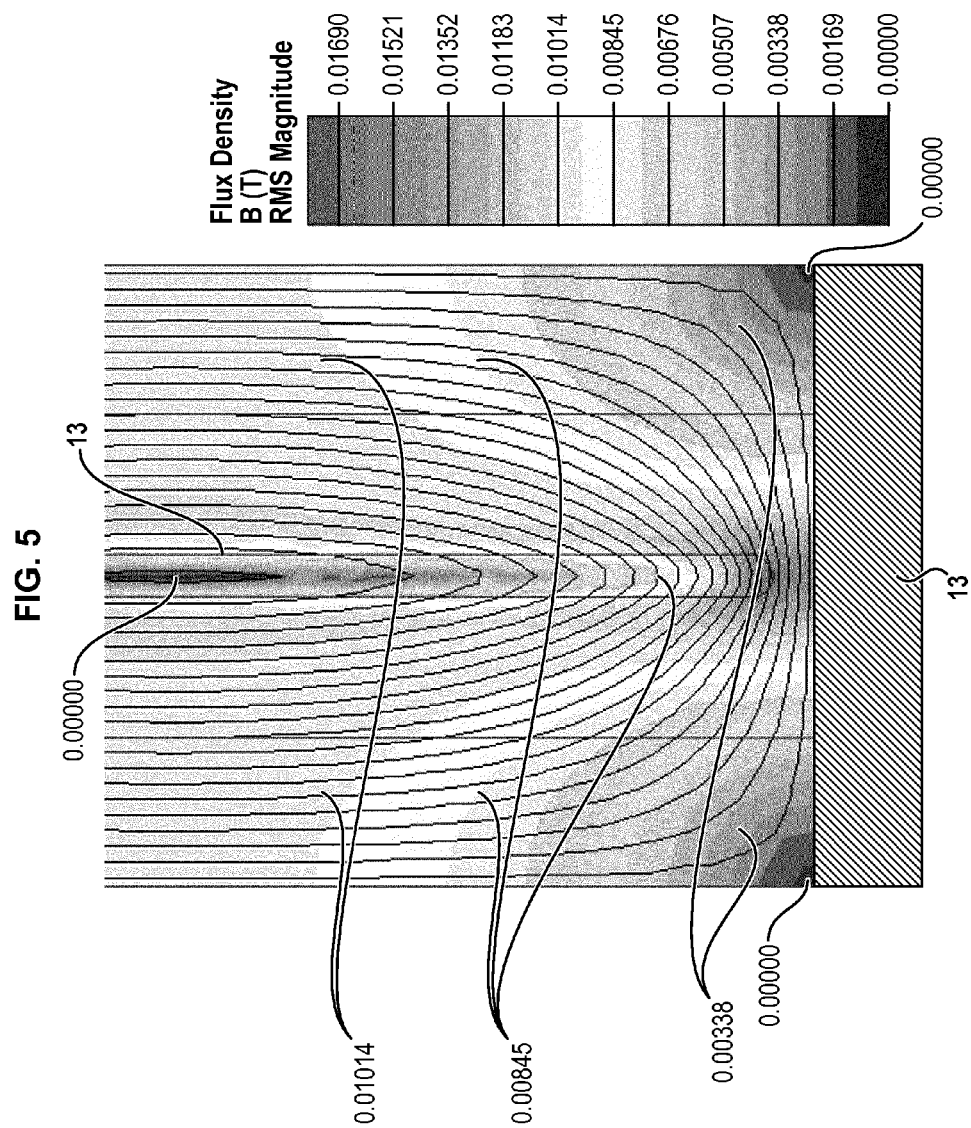

METHOD FOR RECOVERING AND/OR RECYCLING A BITUMINOUS PRODUCT

CROSS-REFERENCE TO RELATED APPLICATIONS

Figure 1:
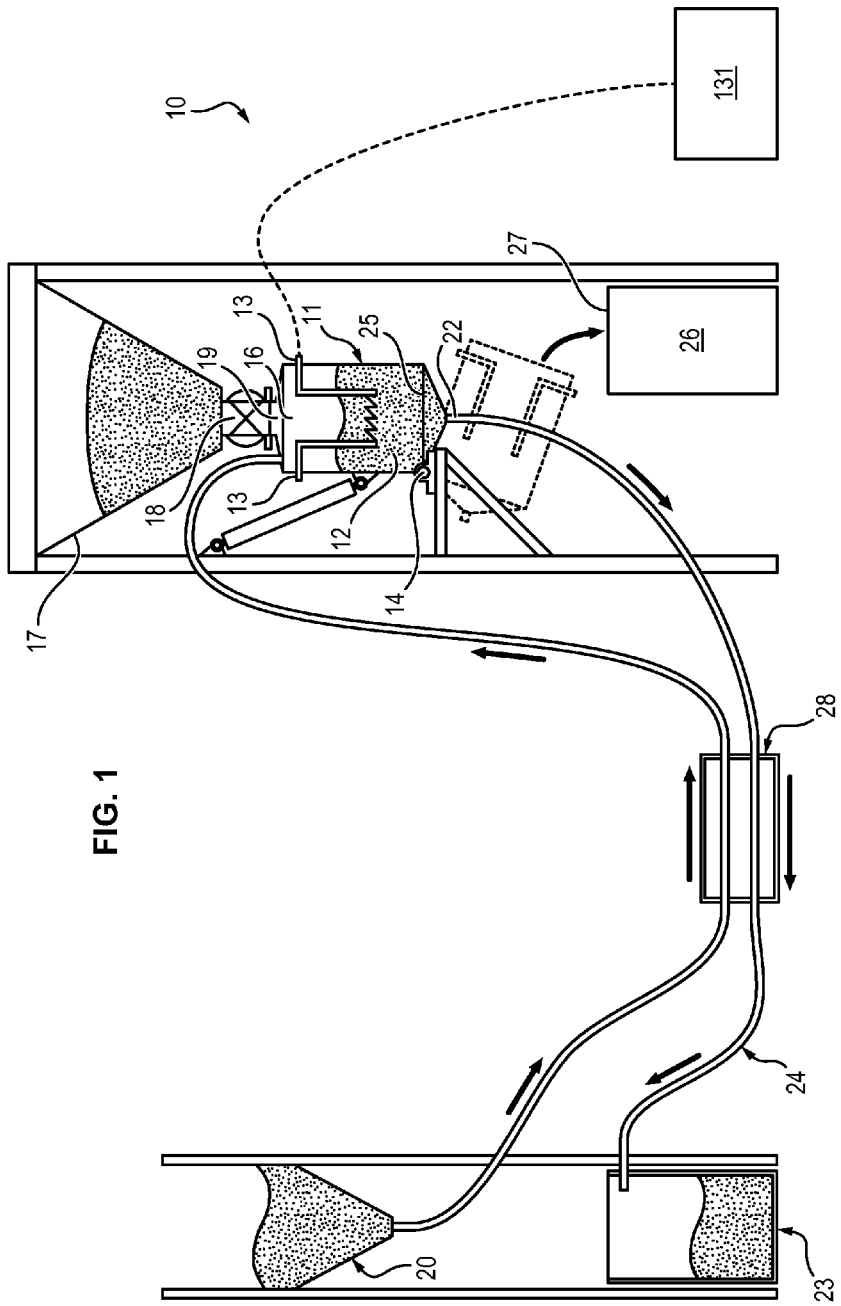

The present application is a national phase entry under 35 U.S.C. § 371 of International Application No. PCT/EP2016/053030 filed on Feb. 12, 2016, published in French, which claims priority from French Patent Application No. 1551187 filed Feb. 13, 2015, all of which are incorporated herein by reference.

FIELD OF THE INVENTION

The present invention relates to the recycling and/or recovering of bituminous products comprising bitumen and elements to be separated, such as glass fibres, mineral fillers and/or granulates.

TECHNOLOGICAL BACKGROUND

Bitumen is a complex matrix, originating from double distillation of raw petrol and essentially composed of aromatic, naphthenic or aliphatic hydrocarbons. Highly viscous or even solid at ambient temperature, it fluidifies and drains off as a Newtonian liquid as soon as its temperature reaches one hundred degrees. The physico-chemical characterisation of bitumen is not easy: dissolution in an adapted hydrocarbon (heptane, for example), separates it into two large families which are maltenes and asphaltenes. The latter constitute the solid, polar part of very high molecular weight of bitumen, giving it a certain number of particular properties.

Due to its different properties, especially its properties of adhesion to most standard media, sealing, stability, thermal and dielectric insulation, and elasticity, bitumen is used in many fields and especially in the field of building and public works (BTP) for road surfacing and sealing membranes.

To reinforce its properties, allow for easier handling and boost its quality, researches have been conducted to modify bitumen and form a modified bitumen or a bituminous binder.

Among modifications imposed over time, incorporating polymers into bitumen has been the most significant (modified bitumen). Whether plastomers, such as polyethylene or polypropylene, or thermoplastic elastomers, such as styrene-butadiene-styrene or styrene-isoprene-styrene, these polymers give bitumen a better elasticity, especially a decrease in thermal susceptibility resulting in a better resistance to cracking at low temperatures, a greater rigidity at high temperatures, and a better resistance to fatigue.

Despite the advantages brought by incorporating polymer into bitumen, the latter cause novel problems such as the production cost of bituminous binder and the considerable sensitivity to temperature and/or ultraviolet radiation of some polymers.

Bitumen or modified bitumen can also be additivated with mineral fillers, for example limestone fillers, or silicates, which can be flame-proofing or not, with various additives in function with the preferred properties of the final product, and be reinforced by a grid comprising fibres of glass and/or polyester (in this case especially sealing membrane) to form the bituminous binder. Some membranes are covered in other mineral products such as sand, or slates, the aim of which, inter alia, is to protect the bituminous binder from ultraviolet radiation. "Soluble elements" will be mentioned hereinbelow to designate the polymers and additives, while mineral fillers and protective elements against ultraviolet rays, and different fibres will be qualified as "insoluble elements".

All these elements tend to make bitumen-based products complex and sources of technical, economic and environmental problems as to their recycling and covering.

Several methods for recycling bituminous products are known from the prior art.

It is for example known to recycle bituminous products by solvolysis. For this, the bituminous product is mixed with a solvent adapted to dissolving bitumen so as to separate the bitumen, and if needed the soluble elements, from the insoluble elements also included in the bituminous product.

However, such a recycling method is also highly restrictive to the extent where the bitumen dissolves slowly, needing several hours, and therefore fails to ensure sufficient yield.

It is also known to recycle bituminous products via thermal processing. For this, the bituminous product is heated so as to separate the bitumen from non-meltable elements of the bituminous product such as fillers.

Also, in both these cases, it is necessary to carry out in advance crushing or cutting of the bituminous product to be recycled so as to increase its specific surface and accordingly favour the dissolution or the fusion of the bitumen. Yet, such crushing or cutting is particularly complicated to perform on the one hand given the viscosity of the bituminous binder which, when heated by the crushing operation, binds the tools and on the other hand given the insoluble elements which were able to be introduced to the bitumen to form the bituminous product, especially the fibres of glass and/or polyester forming the grid.

Also, the high temperatures required for thermal processing and the presence of solvent for solvolysis can pose problems of hygiene, safety and environment.

Another problem relating to use of recycled bituminous binder is due to ageing which the latter undergoes during its lifecycle. In fact, during recycling of bituminous products, even though the recycled bituminous binder (that is, the bitumen separated from the insoluble elements of the initial bituminous product but preserving the soluble elements of said initial bituminous product) is mixed with virgin bitumen and novel insoluble elements (mineral fillers, etc.) and/or novel soluble elements (polymers, etc.), the performance of the bituminous product obtained from this recycled bituminous binder is altered all the same.

The principal mechanism of ageing of bitumen is its oxidation. In fact, the aged bituminous binder has higher viscosity and is more rigid than its virgin version and obvious changes in its composition are observed. These changes can especially result in loss of adhesion of the bituminous product, or in its cracking.

In this respect, rejuvenating of the bituminous binder can prove to be an important part of the recycling process.

For this, it is for example known to use products for rejuvenating bitumen. These products are in general mixed with the bituminous product to be recycled to restore the original characteristics of the oxidised (aged) bitumen in order to soften it and regenerate the volatile materials and the dispersion oils while benefiting adhesion. They restore the initial rapport between asphaltenes and maltenes. Rejuvenating products must generally be strongly aromatic and be able to improve both sensitivity to temperature and hardening of the aged bitumen. They must be composed to boost the peptization power of the maltene phase.

Cooking oil or recycled engine oil, palm oil, canola oil, or sunflower oil are examples of rejuvenating products of bitumen known to the expert. Such rejuvenating products are for example described in the document by Hallizza Asli et al, *Investigation on physical properties of waste cooking oil-Rejuvenated bitumen binder*, Construction and Building Materials 37 (2012) 398-405 relating to the use of cooking oil as rejuvenating products.

According to the grade of the bitumen and the proportion of the added rejuvenating oil (1 to 5% of the volume of bitumen to be rejuvenated), the viscosity, the point of softening, penetrability, and flash point all vary. However, mixing the aged bitumen with the cooking oil in a proportion of 4 to 5% of the volume of bitumen can produce excellent rejuvenating results.

PRESENTATION OF THE INVENTION

The aim of the present invention is to eliminate the drawbacks cited above by proposing a method for recycling and/or recovering a bituminous product, which is rapid, simple, minimally polluting and low in energy consumption.

More precisely, the aim of the present invention is a method for recycling a bituminous product by pulsed power, the bituminous product comprising bitumen and elements to be separated, in which:
- a reactor inside which extend at least two electrodes is supplied with the bituminous product and a liquid medium whereof at least one liquid component exhibits Hansen solubility parameters $\delta$, $\delta p$ and $\delta d$ such that the bitumen exhibits at least partial solubility in the liquid medium, the elements to be separated being insoluble as such,
- a succession of electromagnetic pulses is generated between the electrodes in the reactor so as to produce, based on the power, frequency and switching time of the electromagnetic pulses, at least one shockwave and at least some ultraviolet radiation so as to disperse and dissolve the bitumen in the liquid medium, and to separate the bitumen and the insoluble elements, the liquid medium preventing the bitumen from reconstituting.

Preferably, the liquid component or the liquid components of the liquid medium exhibit:
- a Hansen solubility parameter $\delta h$ less than or equal to 7 $MPa^{0.5}$, preferably less than or equal to 4 $MPa^{0.5}$,
- a Hansen solubility parameter $\delta p$ less than or equal to 7 $MPa^{0.5}$, preferably less than or equal to 4 $MPa^{0.5}$, and
- a Hansen solubility parameter $\delta d$ greater than or equal to 15 $MPa^{0.5}$, preferably greater than or equal to 17 $MPa^{0.5}$.

According to an embodiment of the invention, the bituminous product to be recycled comprises bitumen into which polymers have been incorporated, the liquid medium comprising at least one liquid component having Hansen solubility parameters $\delta h$, $\delta p$ and $\delta d$ such that polymers exhibit at least partial solubility in the liquid medium, and the polymers dissolve with the bitumen in the liquid medium, during generation of the electromagnetic pulses.

Preferably, a succession of electromagnetic pulses is generated, these pulses being transmitted at a frequency between 5 Hz and 225 Hz, preferably between 10 Hz and 40 Hz.

Preferably, electromagnetic pulses of power between $10^6$ W and $10^{14}$ W are generated.

Preferably, electromagnetic pulses with a switching time between 20 and 200 ns are generated.

Preferably, the succession of electromagnetic pulses generates an electromagnetic radiation within the frequency range of microwaves, especially a frequency between 300 MHz and 300 GHz.

Preferably, when electromagnetic pulses are generated, a maximal voltage between the electrodes is between 20 kV and 200 kV.

Preferably, when electromagnetic pulses are generated, a current intensity between the electrodes is between 8 kA and 100 kA. Preferably, the electromagnetic pulses are generated of an average length of 5 to 200 μs.

Preferably, the insoluble elements comprise:
fibres of glass and/or polyester, and/or
mineral fillers, and/or
granulates, and/or
plastic films, and/or
aluminium sheets.

Preferably, after separation of the bitumen and the insoluble elements, the content of the reactor is sifted so as to extract separately from the reactor the dissolved bitumen in the liquid medium and the liquid medium on the one hand, and the insoluble elements on the other hand. More preferably, the content of the reactor is sifted to retain the insoluble elements having a granulometry greater than or equal to 300 μm, preferably greater than or equal to 150 μm.

According to a first embodiment of the invention, the liquid medium is a vegetable oil, or a mineral oil or a synthetic oil or a bitumen.

Preferably, the reactor is supplied with oil in a proportion at least greater than 2% by mass of bituminous product.

Preferably, the oil in the reactor is supplied at a temperature between 20° C. and 200° C., preferably between 40° C. and 120° C.

Preferably, the dissolved bitumen and the oil extracted from the reactor exchange heat with the oil which supplies the reactor so as to heat said oil which supplies the reactor.

According to a second embodiment of the invention, the liquid medium is a mixture of water and a solvent selected from naphtha solvents, aromatic solvents and biosourced solvents.

Preferably, the mixture of water and solvent comprises at least twice as much water as solvent by volume, preferably at least three times more water than solvent by volume.

Preferably, the mixture of water and solvent which supplies the reactor is at a temperature between 15° C. and 27° C.

Preferably, the dissolved bitumen and the mixture of water and solvent are decanted so as to separately recover the recycled bitumen and the mixture of water and solvent.

BRIEF DESCRIPTION OF DIAGRAMS

Figure 2:
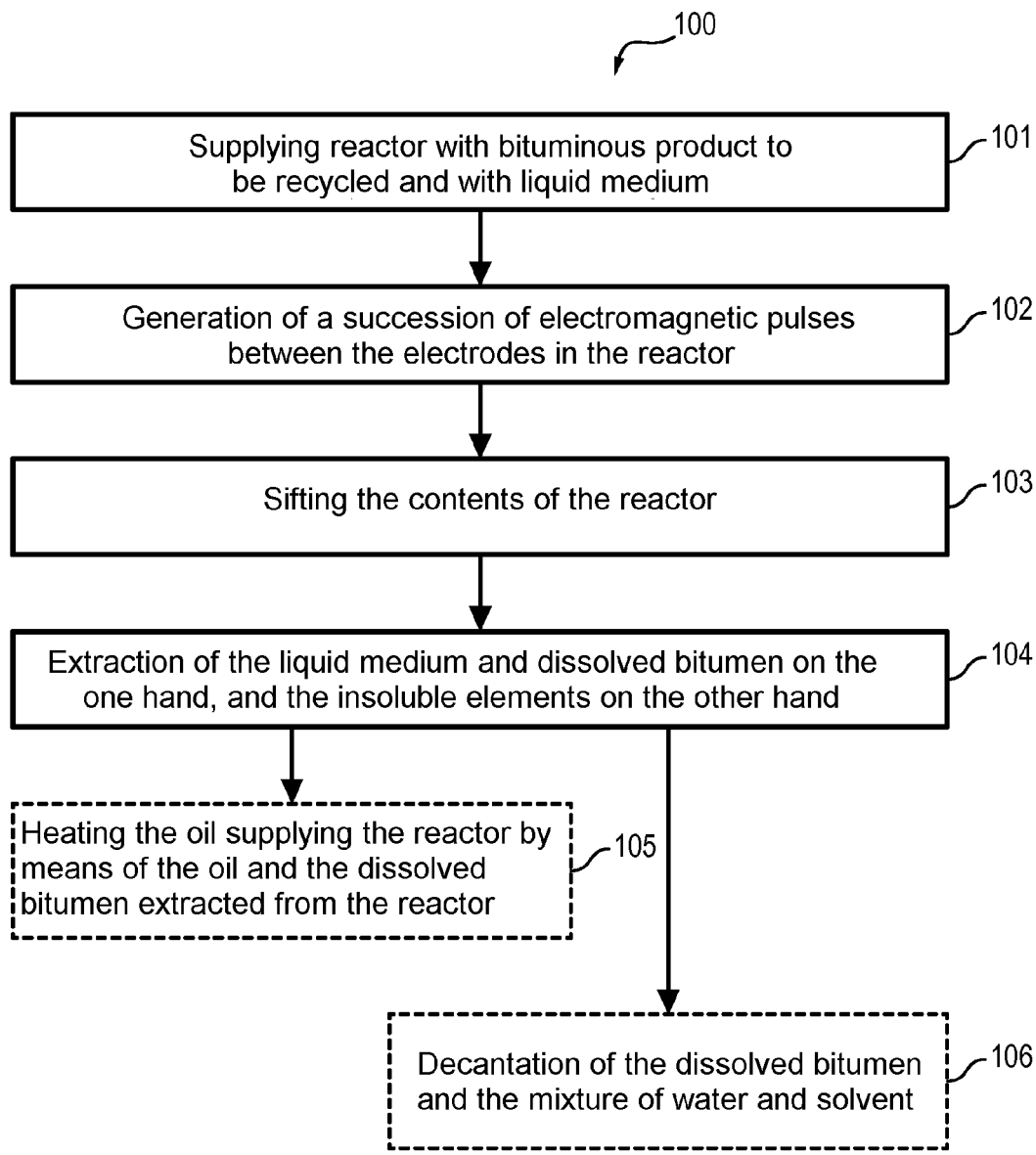
Figure 3:
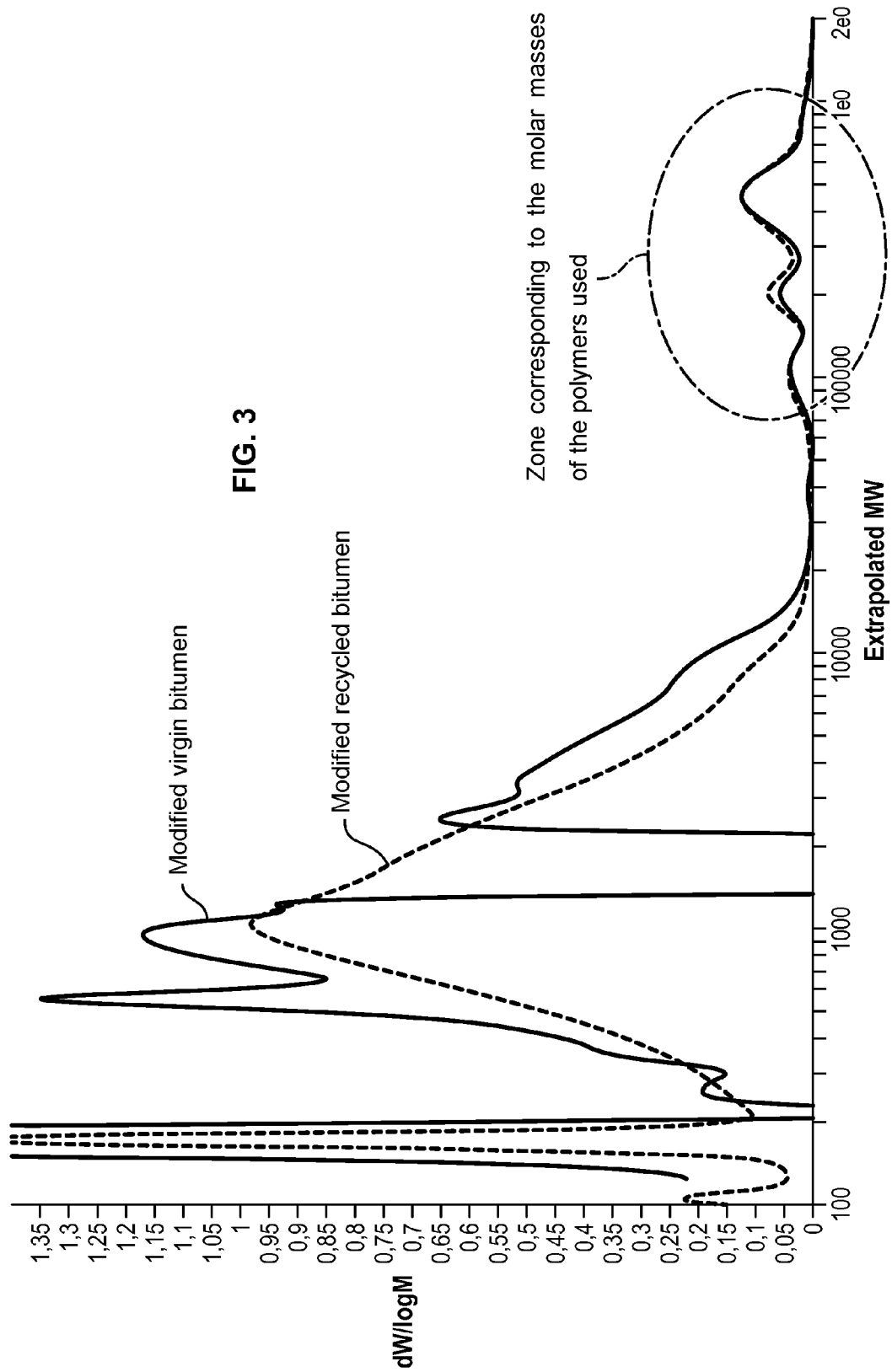

Other characteristics, aims and advantages of the invention will emerge from the following description which is purely illustrative and non-limiting, and which must be considered in conjunction with the attached diagrams, in which:

FIG. 1 is a schematic view of a system for executing a method for recycling and/or recovering a bituminous product according to an embodiment of the invention, FIG. 2 is a flow chart of the method for recycling and/or recovering a bituminous product according to an embodiment of the invention, FIG. 3 is a comparative chromatogram of modified virgin bitumen and modified recycled bitumen according to the invention, FIGS. 4 and 5 are images illustrating an example of an electric field produced during generation of the succession of electromagnetic pulses in the reactor of the system during the method according to the invention.

DETAILED DESCRIPTION OF EMBODIMENTS

FIG. 1 shows a system 10 for executing a method 100 for recycling and/or recovering a bituminous product according to an embodiment of the invention.

"Bituminous product" means any product comprising bitumen and insoluble elements to be separated. These elements to be separated are for example the following:
  mineral fillers, for example limestone fillers or silicates which can be flame-proofing, and/or
  fibres of glass and/or polyester forming for example a grid, the grid also able to be covered with other mineral products such as sand or slates so as to protect the bituminous product form ultraviolet radiation, and/or
  granulates, and/or
  plastic films, and/or
  aluminium sheets.

The bitumen of the bituminous product can also comprise elements called "soluble" such as pigments or other additives, and polymers. The bitumen of the bituminous product can in fact have been modified, that is, polymers can have been incorporated into the bitumen. Such polymers are for example plastomers such as polyethylene or polypropylene, or thermoplastic elastomers such as styrene-butadiene-styrene or styrene-isoprene-styrene.

The system 10 comprises a reactor 11 inside which is arranged a chamber 12 configured to accommodate the bituminous product to be recycled and/or recovered and a liquid medium whereof at least one liquid component exhibits Hansen solubility parameters $\delta h$, $\delta p$ and $\delta d$ such as bitumen and if needed the soluble elements exhibit at least partial solubility in the liquid medium. The elements to be separated are insoluble as such.

The Hansen theory is well known by a skilled person. In particular, the definition and calculation of the solubility parameters in the three-dimensional Hansen solubility space are described in the article by Charles M. Hansen, *The three-dimensional solubility parameters*, J. Paint Technol. 39, 105 (1967). These parameters are also described in the document *Hansen Solubility Parameters: A User's Handbook, Second Edition* by Charles M. Hansen, ISBN 9780849372483.

The Hansen solubility parameters constitute a qualitative and empirical guide widely used in an industrial context. The method predicts, inter alia, the compatibility or the affinity between different chemical substances. To take other intermolecular forces into account, Hansen has decomposed the total cohesion energy of the system in the sum of the cohesion energies corresponding to the modes of main interactions found in current organic materials. This decomposition defines the three solubility parameters: $\delta d$, $\delta p$ and $\delta h$. The parameter $\delta d$ is relative to forces called London "dispersion" (non-polar interactions), the parameter $\delta p$ is linked to Keesom polarity forces (between permanent dipoles) and $\delta h$ represents the hydrogenic links and more generally those interactions involving electronic exchanges. Debye forces (between induced dipoles) are generally low in absolute value and are negligible. In other terms, for two substances to be miscible, it is necessary for their three solubility parameters to be identical or very close. Representatively, Hansen parameters access a three-dimensional solubility space. The unit of Hansen parameters is $MPa^{0.5}$, or $\sqrt{MPa}$.

Preferably, the liquid component or the liquid components of the liquid medium exhibit a parameter $\delta h$ less than or equal to 7 $MPa^{0.5}$, more preferably less than or equal to 4 $MPa^{0.5}$, a parameter $\delta p$ less than or equal to 7 $MPa^{0.5}$, more preferably less than or equal to 4 $MPa^{0.5}$, and a parameter $\delta d$ greater than or equal to 15 $MPa^{0.5}$, more preferably greater than or equal to 17 $MPa^{0.5}$.

According to a first embodiment of the invention, the liquid medium is oil, especially a vegetable oil, a mineral oil or a synthetic oil, possibly recycled. According to this embodiment, the oil in the reactor 11 is for example at a temperature between 20° C. and 200° C., preferably between 40° C. and 120° C. The liquid medium can also be bitumen. In this case, it is the oil or the bitumen which exhibits Hansen solubility parameters $\delta h$, $\delta p$ and $\delta d$ defined such that the bitumen and if needed the soluble elements exhibit at least partial solubility in the liquid medium.

According to a second embodiment of the invention, the liquid medium is a mixture of water and a solvent selected from naphtha solvents, aromatic solvents or even biosourced solvents such as esters. In this case, it is the solvent of the mixture which exhibits Hansen solubility parameters $\delta h$, $\delta p$ and $\delta d$ such as bitumen and if needed the soluble elements exhibit at least partial solubility in the liquid medium.

According to this embodiment, the mixture of water and solvent is at ambient temperature, that is, at a temperature between 15° C. and 27° C.

The reactor 11 is fitted with a pair of electrodes 13 extending inside the chamber 12 of the reactor 11. The pair of electrodes 13 is preferably of point/plane type. The anode preferably forms the point while the cathode is plane. The pair of electrodes 13 is also connected to a discharge circuit comprising a generator 131 of electromagnetic pulses. The generator 131 is preferably a high-voltage generator, for example a Marx generator. The generator stores the electric power without need of a strong supply power. The generator 131 itself is connected to a control unit and to a switch via which the generator 131 releases electric power to the discharge circuit. The switch delivers the electric power stored very quickly (principle of pulsed powers). The switching time corresponds to the time taken by each electromagnetic pulse at the terminals of the electrodes 13 to move from 10 to 90% of its maximal voltage value, as it is being generated 102.

The generator 131 is configured to generate a succession of electromagnetic pulses between the electrodes 13 in the reactor 11 so as to produce, based on the power, frequency and switching time of the electromagnetic pulses, at least one shockwave and at least some ultraviolet radiation, so as to disperse and dissolve the bitumen in the liquid medium, and to separate the bitumen and the insoluble elements, the liquid medium preventing the bitumen from reconstituting, in other words reagglomerating, when the bituminous product is mixed with the liquid medium in the chamber 12 of the reactor 11. The effect of the shockwaves combined with the ultraviolet radiation is to decrease the viscosity of the bituminous binder by micronisation and dispersion in the liquid medium. It is evident that when the bitumen is modified, the polymers incorporated into it are also dissolved in the liquid medium.

Preferably, the power, the frequency and the switching time of the electromagnetic pulses are defined so as to generate electromagnetic radiation in the range of frequencies of microwaves, for example a range of frequencies between 300 MHz and 300 GHz.

Preferably, the generator 131 is configured to generate electromagnetic pulses of power between $10^6$ W and $10^{14}$ W.

Preferably, the generator 131 is configured to generate a succession of electromagnetic pulses, these electromagnetic pulses being transmitted at a frequency between 5 Hz and 225 Hz, more preferably between 10 Hz and 40 Hz.

Preferably, the generator 131 is configured to generate electromagnetic pulses with a switching time between 20 and 200 ns.

Preferably, the generator 131 is configured so that a maximal voltage between the electrodes is between 20 kV and 200 kV.

Preferably, the generator 131 is configured so that a current intensity between the electrodes is between 8 kA and 100 kA.

Preferably, the generator 131 is configured so that an average length of the electromagnetic pulses of from 5 to 200 µs.

The reactor 11 is mounted to pivot relatively to an overall horizontal axis 14 so as to let it rotate between a recycling position (shown in solid lines in FIG. 1) and a discharge position (shown in dotted lines in FIG. 1). The reactor 11 is for example maintained in the recycling position by means of a jack 15 which can be retracted when the aim is to toggle the reactor 11 to the discharge position.

The reactor 11 comprises a first opening 16 arranged in an upper part of the reactor 11, via which, in the recycling position, the reactor 11 is supplied with bituminous product to be recycled and with liquid medium. In the discharge position, the insoluble elements are extracted from the reactor 11 via this upper part, once the bitumen and if needed the soluble elements of the bituminous product have been separated from the insoluble elements and the dissolved bitumen, if needed the soluble dissolved elements, and the liquid medium have been evacuated from the reactor 11.

The reactor 11 is supplied with bituminous product to be recycled by means of a dedicated supply tank 17. The supply tank 17 of bituminous product is placed opposite the first opening 16 of the reactor 11 whenever the latter is in the recycling position. The supply tank 17 of bituminous product is for example placed above the first opening 16 of the reactor 11 whenever it is in the recycling position so as to supply the reactor 11 under the effect of the weight of the bituminous product. The quantity of bituminous product to be recycled introduced in the reactor 11 is regulated for example by means of a valve 18. The supply tank 17 of bituminous product and if needed the valve 18 are for example connected to the first opening 16 of the reactor via a lid 19 configured to close the reactor 11 whenever it is in the recycling position.

The reactor 11 is also supplied with liquid medium by means of a supply tank 20. The supply tank 20 of liquid medium is for example connected to the reactor 11 by means of a supply conduit 21 terminating in the first opening 16 of the reactor, when the latter is in a recycling position. The supply tank 20 of liquid medium and if needed the supply conduit 21 are for example connected to the first opening 16 of the reactor via the lid 19. Preferably, in the supply tank 20 of liquid medium, the liquid medium is stored at ambient temperature, that is, at a temperature between 15° C. and 27° C.

The reactor 11 also comprises a second opening 22 arranged in its lower part, via which the liquid medium, the dissolved bitumen and if needed the soluble elements are evacuated to a recovery tank 23 of recycled bitumen, for example by means of a recovery conduit 24.

When the liquid medium is a mixture of water and solvent, the recovery tank 23 can for example be adapted to decant the dissolved bitumen, if needed the soluble dissolved elements and the mixture of water and solvent, so as to separate the water, the solvent and the modified bitumen under the effect of their difference in density, and especially recover the bituminous binder recycled at the surface of the recovery tank 23. Decantation also lets the bituminous binder resume its initial viscosity.

The reactor 11 is also fitted with a sieve 25 arranged inside the chamber 12 and configured to retain the insoluble elements inside the chamber 12, once the bitumen and if needed the soluble elements have been separated from the insoluble elements. The sieve 25 is configured to retain the insoluble elements having a granulometry greater than or equal to 300 µm, preferably greater than or equal to 150 µm. The sieve 25 is arranged between the first and the second openings 16, 22 of the reactor 11 so as to enable the evacuation of the dissolved bitumen, if needed of the soluble dissolved elements and of the liquid medium via the second opening 22 while retaining the insoluble elements inside the chamber 12 of the reactor 11. Preferably, the plane cathode is sieved so as to form the sieve 25.

The system 10 also comprises a recovery tank 26 of insoluble elements. The recovery tank 26 of insoluble elements comprises an opening 27 arranged opposite the first opening 16 of the reactor 11, when it is in a discharge position. The recovery tank 26 and its opening 27 are for example placed below the first opening 16 of the reactor 11, when the reactor 11 is in a discharge position so as to discharge the insoluble elements separated from the bitumen, and if needed the soluble elements which are retained by the sieve 25 in the chamber 12 of the reactor 11 under the effect of their weight.

Optionally, when the liquid medium is oil, the system 10 can also comprise a heat exchanger 28 traversed by the supply conduit 20 and the discharge pipe 24 and configured to exchange heat from the discharge pipe 24 to the supply conduit 20 so as to heat the oil before its introduction in the reactor 11 by means of the heat transported by the oil, the dissolved bitumen and if needed the soluble dissolved elements discharged via the discharge pipe 24 and generated by Joule effect during generation of the electromagnetic pulses in the reactor 11.

FIG. 2 shows the method 100 for recovering and/or recycling a bituminous product by pulsed power. The method 100 comprises the following steps during which:
the reactor 11 is supplied 101 with bituminous product and liquid medium,
a succession of electromagnetic pulses is generated 102 between the electrodes 13 in the reactor 11 so as to produce, based on the power, frequency and switching time of the electromagnetic pulses, at least one shockwave and at least some ultraviolet radiation, disperse and dissolve the bitumen in the liquid medium, and to separate the bitumen and the insoluble elements, the liquid medium preventing the bitumen from reconstituting, or in other words reagglomerating.

The effect of the shockwave or shockwaves combined with the ultraviolet radiation is to decrease the viscosity of the bituminous binder by micronisation and dispersion in the liquid medium. It is evident also that the physico-chemical affinities of the liquid medium with the bitumen prevents the latter from reagglomerating.

It is evident that when the bitumen also comprises soluble elements, for example polymers such as described earlier, the shockwave and the ultraviolet radiation separate the insoluble elements from the bitumen and the soluble elements which dissolve in the liquid medium. The particular advantage of the method 100 is to not degrade the polymers incorporated into the bitumen of the bituminous product to be recycled, as illustrated in FIG. 3, and enable any decrease in the quantities of polymers to be introduced to the recycled bitumen for later use.

When the liquid medium is oil, the method 100 is particularly advantageous to the extent where it also enables rejuvenating of the bitumen, oxidised over time, as it is being recycled.

When the liquid medium is a mixture of water and solvent, the method 100 is particularly advantageous to the extent where it dissolves bitumen and soluble elements in 30 s.

The electrical field produced by the electromagnetic pulses is illustrated in FIGS. 4 and 5.

According to the first embodiment of the invention, the oil which supplies 101 the reactor 11 is preferably at a temperature between 20° C. and 200° C., more preferably between 40° C. and 120° C. Preferably, the reactor 11 is supplied 101 with oil in a proportion at least greater than 2% by mass of bituminous product. Preferably, the reactor 11 is supplied 101 with oil so as to immerse the bituminous product in the oil. More precisely, the reactor 11 is preferably supplied 101 with a volume of bituminous product corresponding to a percentage of 10 and 60% of the volume of oil supplying the reactor 11.

According to the second embodiment of the invention, the mixture of water and solvent which supplies 101 the reactor 11 is preferably at ambient temperature, that is, at a temperature between 15° C. and 27° C. Preferably, the reactor 11 is supplied 101 with a mixture of water and solvent comprising at least twice as much water as solvent by volume, more preferably substantially three times more water than solvent by volume. Preferably, the reactor is supplied 101 with a mixture of water and solvent so as to immerse the bituminous product in said mixture. In particular, when the mixture of water and solvent comprises substantially three times more water than solvent by volume, the reactor 11 is preferably supplied 101 with a volume of bituminous product corresponding substantially to twice the volume of solvent.

It is evident that to execute the method 100 there is no need to reduce the size of the bituminous products to be processed by a crushing or cutting operation which is particularly complex, especially when the bituminous product comprises fibres of glass and/or polyester.

Preferably, when the electromagnetic pulses are generated 102, the power, the frequency and the switching time of said electromagnetic pulses are defined so as to produce electromagnetic radiation in the range of frequencies of microwaves, for example a range of frequencies between 300 MHz and 300 GHz.

The instantaneous pressure in the liquid medium contained in the reactor can reach 300 bars, during generation (102) of the succession of electromagnetic pulses.

Preferably, electromagnetic pulses of power between $10^6$ W and $10^{14}$ W are generated 102.

Preferably, a succession of electromagnetic pulses is generated 102, these electromagnetic pulses being transmitted at a frequency between 5 Hz and 225 Hz, more preferably between 10 Hz and 40 Hz.

Preferably, electromagnetic pulses with a switching time between 20 and 200 ns are generated 102.

Preferably, when electromagnetic pulses are generated 102, a maximal voltage between the electrodes is between 20 kV and 200 kV.

Preferably, when electromagnetic pulses are generated 102, a current intensity between the electrodes is between 10 kA and 100 kA.

Preferably, electromagnetic pulses of an average length between 5 and 200 μs are generated 102.

The method 100 can also comprise the following steps:
the content of the reactor 11 is sifted 103 so as to extract separately from the reactor 11 the dissolved bitumen, if needed the soluble dissolved elements, and the liquid medium on the one hand, and the insoluble elements on the other hand. The content of the reactor is sifted 103 for example to retain the insoluble elements having a granulometry greater than or equal to 300 μm, preferably greater than or equal to 150 μm, and the dissolved bitumen, if needed the soluble dissolved elements and the liquid medium on the one hand, and the insoluble elements on the other hand are extracted 104 separately from the reactor 11.

Optionally, according to the first embodiment of the invention, the dissolved bitumen, if needed the soluble dissolved elements, and the oil which are extracted 104 from the reactor 11 and whereof the temperature rose by Joule effect during generation 102 of the electromagnetic pulses, exchange 105 heat with the oil which supplies 101 the reactor 11, so as to heat it and if needed to bring it to a temperature between 20° C. and 200° C., preferably between 40° C. and 90° C.

Optionally, according to the second embodiment of the invention, once the dissolved bitumen, if needed the soluble dissolved elements, and the mixture of water and solvent extracted 104 from the reactor 11, the dissolved bitumen, if needed the soluble dissolved elements, and the mixture of water and solvent are decanted 106 so as to separate the water, the solvent and the modified recycled bitumen under the effect of their difference in density, and in this way recover the bituminous binder. Decantation also lets said binder resume its initial viscosity.

The invention claimed is:

1. A method for recycling a bituminous product by pulsed power, the bituminous product comprising bitumen and elements to be separated, wherein the method comprises:
supplying a reactor inside which extend at least two electrodes with the bituminous product and a liquid medium whereof at least one liquid component exhibits Hansen solubility parameters δh, δp and δd such that the bitumen exhibits at least partial solubility in the liquid medium, the elements to be separated being insoluble,
generating a succession of electromagnetic pulses between the electrodes in the reactor so as to produce, based on the power, frequency and switching time of the electromagnetic pulses, at least one shockwave and ultraviolet radiation so as to disperse and dissolve the bitumen in the liquid medium, and to separate the bitumen and the insoluble elements, the liquid medium preventing the bitumen from reconstituting,
wherein the bituminous product to be recycled comprises bitumen in which polymers have been incorporated, the liquid medium comprising at least one liquid component having Hansen solubility parameters δh, δp and δd defined such that the polymers are soluble in the liquid medium, and the polymers dissolve with the bitumen in the liquid medium, during generation (102) of the electromagnetic pulses.

2. The method as claimed in claim 1, in which the liquid component or the liquid components of the liquid medium exhibit:
- a Hansen solubility parameter δh less than or equal to 7 Mpa$^{0.5}$,
- a Hansen solubility parameter δp less than or equal to 7 Mpa$^{0.5}$, and
- a Hansen solubility parameter δd greater than or equal to 15 Mpa$^{0.5}$.

3. The method as claimed in claim 1, in which a succession of electromagnetic pulses is generated, these pulses being transmitted at a frequency between 5 Hz and 225 Hz.

4. The method as claimed in claim 1, in which electromagnetic pulses of power between $10^6$W and $10^{14}$W are generated.

5. The method as claimed in claim 1, in which electromagnetic pulses with a switching time between 20 and 200 ns are generated.

6. The method of claim 1, in which the succession of electromagnetic pulses generates an electromagnetic radiation within the frequency range of microwaves.

7. The method as claimed in claim 1, in which, after separation of the bitumen and the insoluble elements, the content of the reactor is sifted so as to extract separately from the reactor the dissolved bitumen in the liquid medium and the liquid medium on the one hand, and the insoluble elements on the other hand.

8. The method as claimed in claim 7, in which the content of the reactor is sifted to retain the insoluble elements having a granulometry greater than or equal to 300 μm.

9. The method as claimed in claim 1, in which the liquid medium is a vegetable oil, or a mineral oil or a synthetic oil or bitumen.

10. The method as claimed in claim 9, in which the reactor is supplied with liquid medium in a volume proportion at least greater than 50% relative to the volume of bituminous product.

11. The method as claimed in claim 9, in which the liquid medium in the reactor is supplied at a temperature between 20° C and 200° C.

12. The method as claimed in claim 7, in which the dissolved bitumen and the oil extracted from the reactor exchange heat with the oil which supplies the reactor so as to heat said oil which supplies the reactor.

13. The method as claimed in claim 1, in which the liquid medium is a mixture of water and a solvent selected from naphtha solvents, aromatic solvents and biosourced solvents.

14. The method as claimed in claim 13, in which the mixture of water and solvent comprises at least twice as much water as solvent by volume.

15. The method as claimed in claim 13, in which the mixture of water and solvent which supplies the reactor is at a temperature between 15° C and 27° C.

16. The method as claimed in claim 13, in which the dissolved bitumen and the mixture of water and solvent are decanted so as to separately recover the recycled bitumen and the mixture of water and solvent.

17. The method as claimed in claim 1, in which when electromagnetic pulses are generated, a maximal voltage between the electrodes is between 20 kV and 200 kV.

18. The method as claimed in claim 1, in which when electromagnetic pulses are generated, a current intensity between the electrodes is between 8 kA and 100 kA.

19. The method as claimed in claim 1, in which electromagnetic pulses are generated of an average length of 5 to 200 μs.

20. The method as claimed in claim 1, in which the insoluble elements comprise:
- fibres of glass and/or polyester, and/or
- mineral fillers, and/or
- granulates, and/or
- plastic films, and/or
- aluminium sheets.

21. A method (100) for recycling a bituminous product by pulsed power, the bituminous product comprising bitumen and elements to be separated, wherein the method comprises:
- supplying (101) a reactor (11) inside which extend at least two electrodes (13) with the bituminous product and a liquid medium whereof at least one liquid component exhibits Hansen solubility parameters δh, δp and δd such that the bitumen exhibits at least partial solubility in the liquid medium, the elements to be separated being insoluble, wherein the liquid component or the liquid components of the liquid medium exhibit a Hansen solubility parameter δd greater than or equal to 17 MPa$^{0.5}$,
- generating (102) a succession of electromagnetic pulses between the electrodes (13) in the reactor (11) so as to produce, based on the power, frequency and switching time of the electromagnetic pulses, at least one shockwave and ultraviolet radiation so as to disperse and dissolve the bitumen in the liquid medium, and to separate the bitumen and the insoluble elements, the liquid medium preventing the bitumen from reconstituting.

22. A method (100) for recycling a bituminous product by pulsed power, the bituminous product comprising bitumen and elements to be separated, wherein the method comprises:
- supplying (101) a reactor (11) inside which extend at least two electrodes (13) with the bituminous product and a liquid medium whereof at least one liquid component exhibits Hansen solubility parameters δh, δp and δd such that the bitumen exhibits at least partial solubility in the liquid medium, the elements to be separated being insoluble, wherein the liquid component or the liquid components of the liquid medium exhibit a Hansen solubility parameter δh less than or equal to 4 MPa$^{0.5}$,
- generating (102) a succession of electromagnetic pulses between the electrodes (13) in the reactor (11) so as to produce, based on the power, frequency and switching time of the electromagnetic pulses, at least one shockwave and ultraviolet radiation so as to disperse and dissolve the bitumen in the liquid medium, and to separate the bitumen and the insoluble elements, the liquid medium preventing the bitumen from reconstituting.

* * * * *